(12) United States Patent
Waki et al.

(10) Patent No.: US 9,123,964 B2
(45) Date of Patent: Sep. 1, 2015

(54) FUEL CELL ELECTRODE AND PRODUCTION PROCESS THEREOF

(75) Inventors: Keiko Waki, Meguro-ku (JP); Masashi Takano, Meguro-ku (JP); Kunchan Lee, Minato-ku (JP)

(73) Assignees: TOKYO INSTITUTE OF TECHNOLOGY, Tokyo (JP); SHOWA DENKO K.K., Tokyo (JP)

( * ) Notice: Subject to any disclaimer, the term of this patent is extended or adjusted under 35 U.S.C. 154(b) by 589 days.

(21) Appl. No.: 13/365,992

(22) Filed: Feb. 3, 2012

(65) Prior Publication Data
US 2012/0264034 A1    Oct. 18, 2012

Related U.S. Application Data

(60) Provisional application No. 61/443,946, filed on Feb. 17, 2011.

(30) Foreign Application Priority Data

Feb. 4, 2011   (JP) ................. 2011-023361

(51) Int. Cl.
*H01M 4/02*   (2006.01)
*H01M 4/36*   (2006.01)
(Continued)

(52) U.S. Cl.
CPC ............... *H01M 4/90* (2013.01); *B82Y 30/00* (2013.01); *B82Y 40/00* (2013.01); *C01B 31/0253* (2013.01); *H01M 4/96* (2013.01); *C01B 2202/32* (2013.01); *C01P 2006/16* (2013.01); *H01M 4/9016* (2013.01); *H01M 4/9083* (2013.01);

(Continued)

(58) Field of Classification Search
CPC .......... H01M 7/02; H01M 4/36; H01M 4/88; H01M 4/90; H01M 4/9016; H01M 4/9083; B01J 21/18; B01J 21/185; B01J 23/00; B01J 23/40; B01J 23/74
USPC .......... 502/101, 182, 185; 429/523, 527, 528; 977/742, 745, 752, 948
See application file for complete search history.

(56) References Cited

U.S. PATENT DOCUMENTS 5,698,175 A *  12/1997  Hiura et al. ................. 423/447.1
6,479,028 B1*  11/2002  Kaner et al. .................. 423/414
(Continued)

FOREIGN PATENT DOCUMENTS

CN    1397488 A    2/2003
JP    2006-334527 A    12/2006
(Continued)

OTHER PUBLICATIONS

"A class of non-precious metal composite catalysts for fuel cells," Rajesh Bashyam et al. Nature, vol. 443 (Sep. 7, 2006), pp. 63-66.*
(Continued)

*Primary Examiner* — Patricia L Hailey
(74) *Attorney, Agent, or Firm* — Sughrue Mion, PLLC (57) ABSTRACT

A fuel cell electrode that contains a support layer and a catalyst layer, wherein the catalyst layer does not contain a noble metal catalyst and is formed of carbon nanotubes, wherein the carbon nanotubes have pores in sidewalls thereof, and have a pore size distribution of 0.1 nm to 30 nm and a BET specific surface area of 100 to 4,000 m²/g, wherein the pores penetrate or do not penetrate the sidewalls.

9 Claims, 7 Drawing Sheets

Fig. 2

(51) Int. Cl.
  *H01M 4/88* (2006.01)
  *H01M 4/90* (2006.01)
  *B01J 21/18* (2006.01)
  *B01J 23/00* (2006.01)
  *B01J 23/40* (2006.01)
  *B01J 23/74* (2006.01)
  *H01M 4/96* (2006.01)
  *C01B 31/02* (2006.01)
  *B82Y 30/00* (2011.01)
  *B82Y 40/00* (2011.01)

(52) U.S. Cl.
  CPC ............ *Y02E 60/50* (2013.01); *Y10S 977/742* (2013.01); *Y10S 977/745* (2013.01); *Y10S 977/752* (2013.01); *Y10S 977/948* (2013.01)

(56) References Cited

U.S. PATENT DOCUMENTS

| | | | | |
|---|---|---|---|---|
| 8,133,637 | B2 * | 3/2012 | Sun et al. | 429/523 |
| 8,293,675 | B2 * | 10/2012 | Kotrel et al. | 502/185 |
| 8,308,990 | B2 * | 11/2012 | Oriji et al. | 252/503 |
| 2007/0178365 | A1 | 8/2007 | Sugimasa et al. | |
| 2008/0248372 | A1 * | 10/2008 | Min et al. | 429/40 |
| 2008/0280751 | A1 * | 11/2008 | Harutyunyan et al. | 502/87 |
| 2010/0298125 | A1 * | 11/2010 | Kim et al. | 502/185 |
| 2011/0206932 | A1 * | 8/2011 | Waki et al. | 428/400 |
| 2013/0149632 | A1 * | 6/2013 | Yoo et al. | 429/487 |
| 2013/0217567 | A1 * | 8/2013 | Kishimoto et al. | 502/101 |

FOREIGN PATENT DOCUMENTS

| | | | | |
|---|---|---|---|---|
| JP | 2007-203177 A | | 8/2007 | |
| KR | 10-2013-0067476 | * | 6/2013 | ............ H01M 4/90 |

OTHER PUBLICATIONS

"Purification and Characterization of Single-Wall Carbon Nanotubes," I. W. Chiang et al. J. Phys. Chem. B 2001, 105, pp. 1157-1161.*

"Nitrogen-Doped Carbon Nanotube Arrays with High Electrocatalytic Activity for Oxygen Reduction," Kuanping Gong et al. Science, vol. 323 (Feb. 6, 2009), pp. 760-764.*

"Iron-Based Catalysts with Improved Oxygen Reduction Activity in Polymer Electrolyte Fuel Cells," Michel Lefevre et al. Science, vol. 324 (Apr. 3, 2009), pp. 71-74.*

* cited by examiner

FUEL CELL ELECTRODE AND PRODUCTION PROCESS THEREOF

CROSS-REFERENCE TO RELATED APPLICATIONS

This application claims the benefit of U.S. Provisional Patent Application No. 61/443,946 filed on Feb. 17, 2011, the contents of which are hereby incorporated by reference.

BACKGROUND OF THE INVENTION

The present invention relates to a fuel cell electrode that contains a catalyst layer, such as a catalyst layer of an air electrode of a fuel cell (hereinafter, also referred to as a "fuel cell air electrode catalyst") and to a process for producing the fuel cell electrode.

Hitherto, the cathode (air electrode) of a fuel cell generally employs a noble metal, such as platinum, as a catalyst. One alternative non-platinum catalyst is nitrogen-containing carbon (i.e., carbon alloy), which is produced through high-temperature carbonization of a raw material such as polyvinyl-cobalt-phthalocyanine, iron-phthalocyanine, or porphyrin, and has become of interest by virtue of its excellent redox characteristics. However, since a carbon alloy is a carbonaceous material containing metal or nitrogen, the structure thereof is very complex. The catalytic activity of such a carbon material is thought to be regulated by a factor such as the presence of metal (Fe, Co, etc.) or nitrogen doping. However, the active site of redox reaction has not been elucidated, and the approach to enhance the density and durability of the active site has not been established. Such structural issues remain to be resolved.

In the course of research on other non-platinum carbon catalysts, a cobalt/polypyrrole/carbon complex catalyst having high redox activity has been reported to have Co—N active sites (Nature VOL. 443, 63-66 (2006)). Some iron-on-carbon catalysts have been reported to have an Fe—$N_4$ structure fixed in pores of carbon, which structure exhibits catalytic activity (Science VOL. 324, 71-74 (2009)). In the case of a catalyst formed of carbon nanotube (CNT) particles (hereinafter, also referred to as "carbon nanotubes"), carbon atoms having an electron density reduced by N-doping and bonded to the dopant N atom serve as reaction sites (Science VOL. 323, 760-764 (2009)). In each study, nitrogen is considered to play an important role in providing catalytic activity. Thus, in actual catalyst production processes, toxic ammonia gas, expensive nitrogen-metal complex, etc. are employed.

Conventional carbon nanotubes have drawbacks such as small specific surface area and weak interaction with catalyst microparticles. In order to overcome the drawbacks, studies on CNT surface treatment methods to produce carbon nanotubes having large specific surface area (preferably equal to or higher than that of carbon black), strong interaction with catalyst microparticles, and pores in walls thereof were conducted, and as a result U.S. Patent Publication No. 2011/0206932 discloses a method for producing such CNTs.

RELATED ART DOCUMENTS

Patent Documents

U.S. Patent Application Publication No. 2011/0206932

Non-Patent Documents

Non-Patent Document 1: Nature, VOL. 443, pp. 63-66 (2006)
Non-Patent Document 2: Science, VOL. 324, pp. 71-74 (2009)
Non-Patent Document 3: Science, VOL. 323, pp. 760-764 (2009)

SUMMARY OF THE INVENTION

The inventors of the present application have investigated the redox property of the modified CNTs disclosed in U.S. Patent Application Publication No. 2011/0206932 and, quite surprisingly, have found that the modified CNTs themselves are suitable for an electrode of a fuel cell, such as the air electrode of a fuel cell.

The present invention provides the following inventions:

(1) a fuel cell electrode that contains a support layer and a catalyst layer, wherein the catalyst layer does not contain a noble metal catalyst and is comprised of carbon nanotubes, wherein the carbon nanotubes have pores in sidewalls thereof, and have a pore size distribution of 0.1 nm to 30 nm and a BET specific surface area of 100 to 4,000 $m^2/g$, wherein the pores penetrate or do not penetrate the sidewalls;

(2) a fuel cell electrode as recited in (1) above, wherein the carbon nanotubes have a multi-wall structure;

(3) a fuel cell employing a fuel cell electrode as recited in (1) or (2) above;

(4) a membrane electrode assembly comprising a cathode, an anode and an electrolyte membrane interposed between the cathode and the anode, wherein the cathode and/or the anode is the electrode as recited in (1) or (2) above;

(5) a membrane electrode assembly comprising a cathode, an anode and an electrolyte membrane interposed between the cathode and the anode, wherein the cathode is the electrode as recited in (1) or (2) above;

(6) a fuel cell comprising the membrane electrode assembly as recited in (4) or (5) above;

(7) a polymer electrolyte fuel cell comprising the membrane electrode assembly as recited in (4) or (5) above;

(8) a process for producing a fuel cell electrode comprising depositing a metal oxide or a metal nitrate in the form of microparticles on the surfaces of carbon nanotubes, and heating the carbon nanotubes at 100 to 1,000° C. in an oxygen-containing atmosphere to form a catalyst, and applying the catalyst to a support layer;

(9) a process for producing a fuel cell electrode as recited in (8) above, wherein the metal oxide is cobalt oxide, iron oxide, vanadium oxide, tin oxide, or nickel oxide, and the metal nitrate is cobalt nitrate, iron nitrate, vanadium nitrate, tin nitrate, or nickel nitrate;

(10) a process for producing a fuel cell electrode as recited in (8) above, wherein the catalyst is formed by the sequential steps of depositing a metal oxide or a metal nitrate in the form of microparticles on the surfaces of carbon nanotubes, heating the carbon nanotubes at 100 to 1,000° C. in an oxygen-containing atmosphere, and removing the metal oxide microparticles with acid;

(11) a process for producing a fuel cell electrode as recited in (8) above, wherein the catalyst is formed by the sequential steps of depositing a metal oxide or a metal nitrate in the form of microparticles on the surfaces of carbon nanotubes, heating the carbon nanotubes at 100 to 1,000° C. in an oxygen-containing atmosphere, removing the metal oxide microparticles with acid, and heating the treated carbon nanotubes at 500 to 3,000° C. in inert gas or vacuum;

(12) a process for producing a fuel cell electrode as recited in (8) to (11) above, wherein the carbon nanotubes have a multi-wall structure.

(13) a fuel cell employing a fuel cell electrode produced through a process for producing a fuel cell electrode as recited in (8) to (11) above;

(14) a fuel cell employing a fuel cell electrode as recited in (2) above;

(15) a process for producing a fuel cell electrode as recited in (9) above, wherein the catalyst is formed by the sequential steps of depositing a metal oxide or a metal nitrate in the form of microparticles on the surfaces of carbon nanotubes, heating the carbon nanotubes at 100 to 1,000° C. in an oxygen-containing atmosphere, and removing the metal oxide microparticles with acid;

(16) a process for producing a fuel cell electrode as recited in (15) above, wherein the catalyst is formed by the sequential steps of depositing a metal oxide or a metal nitrate in the form of microparticles on the surfaces of carbon nanotubes, heating the carbon nanotubes at 100 to 1,000° C. in an oxygen-containing atmosphere, removing the metal oxide microparticles with acid, and heating the treated carbon nanotubes at 500 to 3,000° C. in inert gas or vacuum.

Effects of the Invention

The present invention enables provision, without intentional addition of metal or nitrogen, of a fuel cell electrode employing as an electrode catalyst, such as an air electrode catalyst, modified CNTs having the same redox activity as that of a conventional "carbon alloy catalyst." Namely, as compared with conventional air electrode catalysts, the present invention attains the following advantages. 1) The invention requires no cumbersome processes such as nitrogen doping by use of ammonia gas and can provide an electrode containing a pure-carbon catalyst having high stability and high electrical conductivity. 2) Carbon is generally employed as a Pt catalyst carrier in a conventional electrode. Due to the oxidation action of Pt, carbon is oxidized to $CO_2$, which undesirably corrodes the (Pt) catalyst. In contrast, the carbon catalyst (carbon nanotubes) in the electrode of the present invention, which electrode and catalyst contain no metallic catalyst component such as Pt, attains high durability.

In general, oxygen reduction onset potential is employed as an index for the redox activity of oxygen. In other words, the higher the potential, the higher the activity. In an acidic electrolyte, the oxygen reduction onset potential in the presence of a platinum catalyst is generally about 0.9 V as measured versus a reversible hydrogen electrode (vs. RHE). However, according to the present invention, an oxygen reduction onset potential of, for example, 0.8 V (vs. RHE) or higher can be attained without employment of platinum or the like supported on a carrier.

DETAILED DESCRIPTION OF THE INVENTION

The fuel cell air electrode catalyst employed in the electrode of the present invention is formed of surface-modified carbon nanotubes and is produced through heating, in an oxygen-containing atmosphere at 100 to 1,000° C., carbon nanotubes on which a metal oxide or a metal nitrate has been deposited. The carbon nanotubes employed in the electrode of the present invention have pores which are provided by corroding carbon walls of the carbon nanotubes having a carbon ring structure mainly including a 6-membered ring-arranged structure (graphene layers, graphite layers) and/or additional such pores penetrating the carbon walls.

The production process will next be described. According to the present invention, carbon nanotubes on which a metal oxide or a metal nitrate has been deposited are heated at about 100 to about 1,000° C., in an oxygen-containing atmosphere (e.g., oxygen or air). In the heating process, the cycle of two oxidation states of the metal oxide (i.e., oxidation state and reduction state) is established via solid phase reaction between the metal oxide and carbon of CNTs, whereby the surfaces of CNTs are corroded to provide pores (in other words, defects). In the cyclic reaction, reduction of metal oxide by carbon in the metal oxide microparticle-deposited CNTs and oxidation by oxygen repeatedly occur, whereby carbon is corroded to thereby provide pores. In other words, metal oxide serves as a catalyst for the reaction between carbon and oxygen, whereby surface-modified CNTs having new characteristics are yielded.

No particular limitation is imposed on the metal oxide employed in the present invention, so long as the metal oxide allows repetition in oxidation of carbon of the carbon nanotubes and oxidation of the metal oxide formed through reduction by carbon. Alternatively, a metal nitrate which readily forms a corresponding metal oxide may also be employed. Examples of the metal oxide include cobalt oxide, iron oxide, vanadium oxide, tin oxide, and nickel oxide. Of these, cobalt oxide is preferred. Examples of the metal nitrate include cobalt nitrate, iron nitrate, vanadium nitrate, tin nitrate, and nickel nitrate. Of these, cobalt nitrate is preferred.

Figure 1:
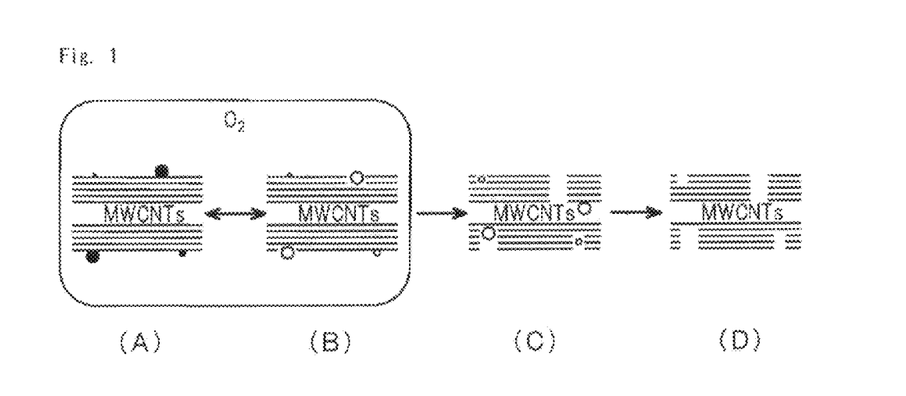
FIG. 1 is a schematic view illustrating in: (A) deposition and oxidation of CoO microparticles on a multi-layer carbon nanotube (MWCNT); (B) a state where a $Co_3O_4$ fine particle as a catalyst produced by the oxidation of CoO fine particle in (A) above is reduced with carbon of MWCNT to open a pore; (C) a MWCNT ($Co_3O_4$/MWCNT) including $Co_3O_4$ microparticles that remain and are present in the pores provided in (B) above; and (D) a pored (defected) MWCNT (DMWCNT) obtained by treating the $Co_3O_4$/MWCNT of (C) above with an acid to remove the $Co_3O_4$ microparticles.
Figure 2:
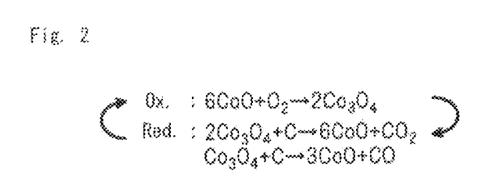
FIG. 2 is scheme of an oxidation-reduction cyclic reaction including an oxidation reaction of CoO with oxygen ($O_2$) to form $Co_3O_4$ and a reduction reaction of the formed $Co_3O_4$ with carbon (C) to form CoO.

FIG. 1 shows a reaction scheme when the metal oxide is cobalt oxide, and FIG. 2 shows a redox cyclic reaction scheme thereof.

FIG. 1(A) illustrates deposition of CoO microparticles on a multi-layer carbon nanotube (MWCNT), and FIG. 1(B) illustrates the opening or formation of open pores in an MWCNT in the presence of $Co_3O_4$ microparticles as a catalyst.

FIG. 1(C) illustrates an MWCNT ($Co_3O_4$/MWCNT) including $Co_3O_4$ microparticles that remain in the pores provided in (B), and FIG. 1(D) illustrates a defected multi-wall carbon nanotube (DMWCNT) from which $Co_3O_4$ microparticles described in (C) above have been removed through acid treatment of the $Co_3O_4$/MWCNT.

FIG. 2 shows a cyclical oxidation-reduction cyclic reaction including an oxidation reaction of CoO with oxygen ($O_2$) which occurs on the surfaces of CoO microparticles deposited on CNTs, and a reduction reaction of the formed $Co_3O_4$ with carbon (C) of CNTs to form metal oxide CoO microparticles.

The oxidation-reduction cyclic reaction requires oxygen, and the target reaction proceeds by heating the reaction system in an oxygen-containing atmosphere. The reaction can be controlled by modifying the oxygen concentration of the atmosphere, whereby the degree of modification of CNTs can be controlled. Generally, the reaction is carried out in air under atmospheric pressure. The reaction temperature is 100 to 500° C., preferably 200 to 300° C. When the reaction temperature is lower than 100° C., the reaction requires a long period of time, which is not practical, whereas when the reaction temperature is in excess of 500° C., loss of CNTs increases, which is not preferred.

Examples of the known type of carbon nanotubes include single-wall, double-wall, and multi-wall. No particular limitation is imposed on the form of CNTs, but multi-wall carbon nanotube (MWCNT) is suitably employed as CNT in the present invention. A CNT having bamboo-like nodes (so-called bamboo-form CNT) may also be employed. If needed, carbon nanotubes may be subjected to preliminary treatment for purification before use. Purification of CNTs may be performed through heating or treatment with acid. In the case where CNTs have sufficient purity, such a purification step is not required. However, in order to remove carbon debris such as amorphous carbon remaining on the surfaces, CNTs are preferably treated at about 500 to about 600° C. When the heating temperature is lower than 500° C., amorphous carbon fails to be removed, whereas when the heating temperature is higher than 600° C., CNTs may be excessively oxidized.

When impurities originating from metallic catalyst components or the like during production of carbon nanotubes are removed, acid treatment is performed to remove them. The acid which may be employed in the treatment is an acid which can dissolve metallic catalyst components (e.g., sulfuric acid or nitric acid). When concentrated sulfuric acid is used, CNTs may be excessively oxidized. Therefore, a mixture of concentrated nitric acid and sulfuric acid or a like mixture is preferably employed.

No particular limitation is imposed on the method for depositing metal oxide microparticles on the surfaces of carbon nanotubes. For example, in the case of cobalt oxide, the following procedure may be applied.

Deposition of Cobalt Oxide

If required, CNTs are subjected to heating and/or acid treatment. A solvent such as methanol or ethanol is added to the optionally treated CNTs, and the mixture is stirred by means of an ultrasonic bath to disperse the CNTs, followed by further stirring by means of a stirrer. To the thus-obtained mixture, aqueous cobalt chloride ($CoCl_2 \cdot 6H_2O$) is added. To the mixture, a solvent (e.g., methanol or ethanol) and 1M aqueous tetramethylammonium hydroxide are added, and the mixture is stirred by means of a stirrer. The mixture is filtered, and the solid matter is washed with a solvent such as methanol or ethanol, followed by drying in a vacuum drying furnace at about 60° C., to thereby yield cobalt-chloride-deposited CNTs. The cobalt-chloride-deposited CNTs are heated at 100° C. to 300° C. in air or, if required, in an inert gas atmosphere such as argon (Ar), to thereby yield cobalt oxide (CoO) microparticle-deposited CNTs. When the heating is performed under Ar at about 100 to about 500° C., cobalt oxide can be yielded.

Deposition of Cobalt Nitrate

Cobalt nitrate ($Co(NO_3)_2 \cdot 6H_2O$) is mixed with a solvent such as methanol or ethanol under stirring, and CNTs are added to the formed solution. The CNTs are dispersed into the solution by means of an ultrasonic bath, and the dispersion is heated to 100° C., to thereby remove the solvent. The thus-dried matter is pulverized, to thereby yield cobalt nitrate ($Co(NO_3)_2 \cdot 6H_2O$)-deposited CNT powder.

No particular limitation is imposed on the particle size of the metal oxide or metal nitrate microparticles deposited on the surface of the carbon nanotubes, and the particle size of the metal-deposited particles, which varies depending on the treatment conditions, is about 0.5 nm to several nanometers, such as, for example, 0.5 to 5 nm. Through heating in an oxygen-containing atmosphere, the particle size after reaction, which varies depending on the treatment conditions, is about 1 nm to several tens of nanometers, such as, for example, 1 to 50 nm.

Provision of Pores (Defects)

Through heating, in air, carbon nanotubes on which a metal oxide or a metal nitrate has been deposited, pores (defects) can be introduced to the carbon nanotubes. Such defects can be readily introduced to carbon nanotubes through heating carbon nanotubes on which a cobalt oxide or a cobalt nitrate has been deposited, at relatively low temperature in air by means of an electric furnace or the like. Particularly when cobalt nitrate is used, carbon nanotubes having pores of interest can be produced through heating at a low temperature of about 200° C. for a short period of time.

After reaction, remaining metal oxide microparticles can be removed through acid treatment. In this step, an acid which can dissolve metal oxide, such as sulfuric acid or nitric acid, may be used.

After completion of acid treatment, the carbon nanotubes having pores may be heated in an inert gas atmosphere (e.g., argon or nitrogen) or in vacuum at about 500 to about 3,000° C., to thereby appropriately reduce or remove functional groups remaining on the pore surfaces. Thus, more suitable active sites can be formed in the fuel cell air electrode catalyst.

According to the aforementioned procedure, CNT surfaces can be provided with a large number of defects (pores) carbon nanotube while the crystallinity of carbon nanotubes is maintained. The pores (defects) are provided through partially corroding carbon walls thereof having a carbon ring structure mainly including a 6-membered ring-arranged structure (graphene layers, graphite layers). Furthermore, such pores partially or thoroughly penetrate the carbon layers (sidewalls) of CNTs. Oxygen-containing functional groups are formed on the surfaces of the pores.

The term "pores penetrating" or a similar term such as "pores which penetrated" as used herein refers to a hole made on the side wall of CNT that reaches an inner hole of the tube, and thus thoroughly (completely) penetrates the carbon layer of CNT. The term "pores not-penetrating" or a similar term such as "pores . . . do not penetrate" as used herein refers to a hole made on the side wall of CNT that does not reach the inner hole of the tube so the hole on the side wall has a bottom in the side wall. The diameter of CNT preferably is from 1 nm to 500 nm, more preferably from 1 nm to 100 nm, most preferably 5 nm to 50 nm because a penetrating hole can be made more easily on the wall of a thinner CNT. A CNT can have a combination of pores that penetrate and pores that do not penetrate.

Since the aforementioned technique is based on solid-phase reaction between solid substances, the pore (defect)-provision sites can be readily regulated. When vapor-phase reaction or liquid-phase reaction is employed, reaction occurs uniformly on the entire surfaces of CNTs, making the regulation difficult. However, the present invention employs solid-phase reaction, the pore (defect)-provision sites can be readily regulated, since reaction occurs at specific sites (local sites) of CNT surfaces on which oxide microparticles are deposited.

In other words, through modification of the particle size of the metal oxide or metal nitrate to be deposited on CNTs, deposition density (concentration), reaction atmosphere, etc., the pore size, the pore depth, the number of pores, and the pore density can be changed, whereby DMWCNT products having a variety of properties for various uses can be provided. For example, by increasing the number of repetitions of the redox cyclic reaction (i.e., prolonging the reaction time), walls of CNTs can be provided with pores extending long the thickness direction of the walls. In this case, oxide microparticles are deposited on the surfaces of the thus-provided pores, and redox cyclic reaction may be further performed, whereby the inner walls of CTNs can also be provided with pores. Alternatively, by performing the redox cyclic reaction at an elevated metal oxide microparticle deposition density, reaction between metal oxide microparticles and oxygen occurs specifically along the direction parallel to the walls of CNTs. In this case, layer-thickness-reduced multi-wall carbon nanotubes (MWCNTs) can be produced.

The CNTs employed in the present invention exhibit the same redox activity as that of a conventional "carbon alloy catalyst" even though the CNTs contain no metal or nitrogen as described above. However, metallic material employed in the production steps may remain in CNTs, and a metal or nitrogen may be incorporated into CNTs in an amount smaller than a conventionally employed amount in accordance with need.

The CNTs employed in the present invention have pores in sidewalls thereof. The pore size substantially falls within a range of 0.1 nm to 30 nm, preferably 0.1 nm to 10 nm. The carbon nanotubes have a BET specific surface area of 100 to 4,000 $m^2/g$, preferably 200 to 1,500 $m^2/g$ from a practical viewpoint. The specific surface area is remarkably higher than that of non-modified conventional carbon nanotubes.

The fuel cell air electrode catalyst employed in the present invention employs the aforementioned modified CNTs and can be applicable to an air electrode of fuel cells in a routine manner. For example, a unit cell is fabricated by sandwiching electrolyte (e.g., polymer electrolyte membrane) with an air electrode and a fuel electrode (counter electrode). A plurality of the unit cells are stacked with separators intervening between two unit cells, to thereby fabricate a cell stack structure.

The fuel cell catalyst layers may be formed by any methods without limitation. For example, a suspension containing the catalyst and an electrolyte may be applied to an electrolyte membrane or a gas diffusion layer. The application methods include dipping, screen printing, roll coating and spraying. In another embodiment, a suspension containing the catalyst and the electrolyte may be applied or filtered on a substrate to form a fuel cell catalyst layer, and the catalyst layer may be transferred to an electrolyte membrane.

Electrodes of the present invention comprise the fuel cell catalyst layer and a support layer which is generally porous.

The electrodes of the present invention may be used as cathodes or anodes. The electrodes of the present invention have excellent durability and high catalytic performance, and hence are suitably used as cathodes, leading to high industrial advantage.

The support layer is a layer which diffuses gas (hereinafter, also the gas diffusion layer). The gas diffusion layers are not particularly limited as long as they have electron conductivity, high gas diffusion properties and high corrosion resistance and are porous. Carbon-based porous materials such as carbon paper and carbon cloth, and stainless steel and anti-corrosive-coated aluminum foils for weight reduction are generally used.

Membrane electrode assemblies of the present invention have a cathode, an anode and an electrolyte membrane between the cathode and the anode. The cathode and/or the anode is the electrode as described hereinabove.

The electrolyte membranes may be generally perfluorosulfonic acid electrolyte membranes or hydrocarbon electrolyte membranes. Further, polymer fine-pore membranes impregnated with liquid electrolyte, or porous membranes filled with polymer electrolyte may be used.

Fuel cells of the present invention have the membrane electrode assemblies as described above.

EXAMPLES

The present invention will next be described in detail by way of Examples and Comparative Examples, which should not be construed as limiting the invention thereto.

Example 1

1) Purification of MWCNTs Through Preliminary Treatment

Multi-wall carbon nanotubes (MWCNTs, product of Aldrich) were heated for purification in air at 500° C. for 1 hour. A portion (1 g) of the thus-purified MWCNTs was fed to a processing tank containing a solution mixture of concentrated nitric acid (product of Wako Pure Chemical Industries, Ltd., nitric acid content of 69%) (40 mL) and 2M sulfuric acid (product of Wako Pure Chemical Industries, Ltd., sulfuric acid content of 97%) (40 mL). The thus-obtained dispersion containing MWCNTs and placed in the processing tank was heated to boiling by means of an oil bath at 120° C. for 4 hours under stirring. Subsequently, the dispersion containing MWCNTs was cooled for one hour and diluted with ultrapure water to a total volume of 400 mL, and the diluted dispersion was further stirred for 3 hours. The resultant dispersion containing MWCNTs was filtrated, and MWCNTs remaining on a filter paper were washed twice with ultrapure water (200 mL), followed by drying and pulverization. Hereinafter, the MWCNTs which were processed through the above acid solution treatment are referred to as preliminarily treated purified MWCNTs.

2) Deposition of Cobalt Nitrate

Cobalt nitrate (II) hexahydrate (product of Wako Pure Chemical Industries, Ltd., purity: 99.5%) (0.05482 g) and ethanol (100 mL) were added to a beaker, and the mixture was stirred for about 2 hours, to thereby form a solution. The preliminarily treated purified MWCNTs (0.1 mg) were added to the solution, and the mixture was treated by means of an ultrasonic bath for 15 minutes, to thereby disperse MWCNTs.

The thus-obtained dispersion was heated to 100° C. to evaporate ethanol, and the dried sample was pulverized. The resultant powder was heated at 300° C. for 2 hours under Ar, to thereby deposit cobalt oxide microparticles on CNTs (CoO/MWCNT).

3) Formation of Pores (Defects)

Figure 3:
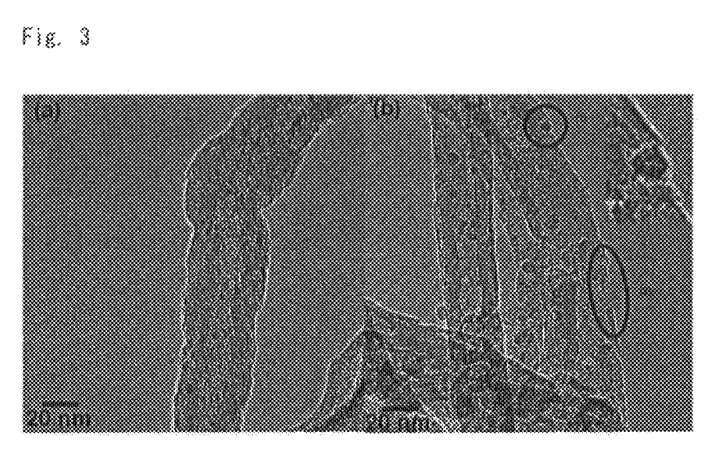
FIG. 3 is, in section (a), a transmission electron microscopic image of MWCNTs on which CoO microparticles are deposited; and in (b) a transmission electron microscopic image of a $Co_3O_4$/MWCNT sample produced through heating in air the carbon nanotubes of section (a).

An appropriate amount of the CoO/MWCNT sample was taken and heated at 250° C. for 6 hours in air. FIG. 3 shows a transmission electron microscope (H8100, product of Hitachi Ltd.) image of the heated sample. As shown in FIG. 3, sidewalls of MWCNTs were provided with pores penetrating the sidewalls (see the oblonged circled area (2) of FIG. 3), and this reveals that cobalt oxide microparticles intruded the nanotubes. There were also observed some cobalt oxide microparticles which did not penetrate sidewalls of MWCNTs and which remained in the sidewalls (see the circled area (1) of FIG. 3).

The pores which penetrated or did not penetrate the sidewalls were found to have a diameter almost equivalent to the particle size of the cobalt oxide microparticles (about 0.1 nm to about 5 nm), that is, the pores had a diameter of about 0.1 nm to about 5 nm.

Figure 4:
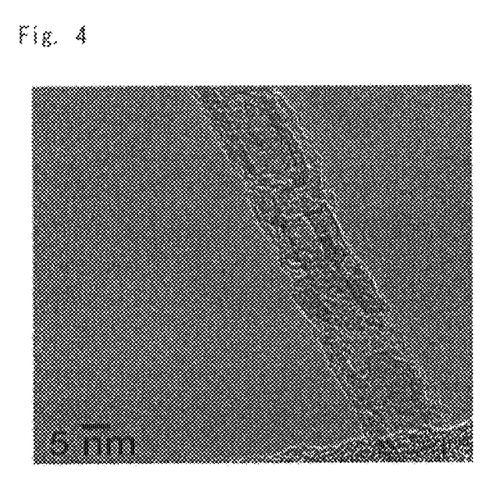
FIG. 4 is a transmission electron microscopic image of DMWCNT produced in Example 1.
Figure 5:
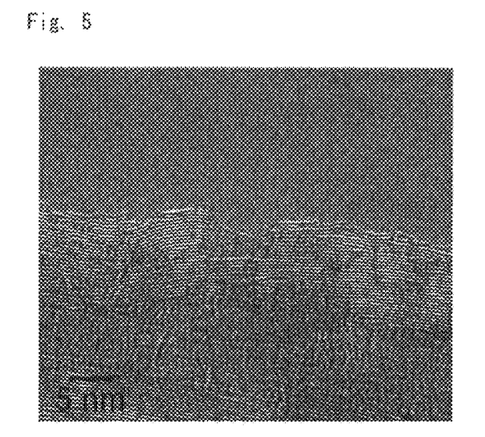
FIG. 5 is an enlarged transmission electron microscopic image of the image of FIG. 4.

XRD analysis revealed that the structure of cobalt oxide was changed from CoO to $Co_3O_4$ through heating at 250° C. in air. The $Co_3O_4$/MWCNT sample was added to 2M $H_2SO_4$ (40 mL), and the mixture was stirred for 3 hours for acid treatment, to thereby remove $Co_3O_4$, whereby carbon nanotubes provided with pores (DMWCNTs) were yielded. FIG. 4 shows a transmission electron microscope image of the DMWCNTs, and FIG. 5 shows an enlarged view of the image. As clearly shown in FIG. 4, the sidewalls of carbon nanotubes were provided with pores penetrating the sidewalls thereof to a depth of 5 nm to 10 nm. As shown in FIG. 5, pores not penetrating sidewalls thereof (i.e., penetrating 10 to 20 graphene layers) were also provided.

Figure 6:
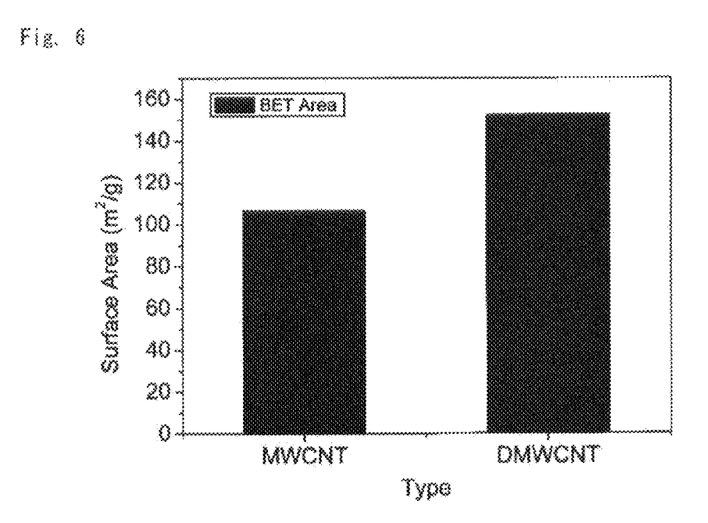
FIG. 6 is a graph showing the BET specific surface areas of MWCNT and DMWCNT produced in Example 1.
Figure 7:
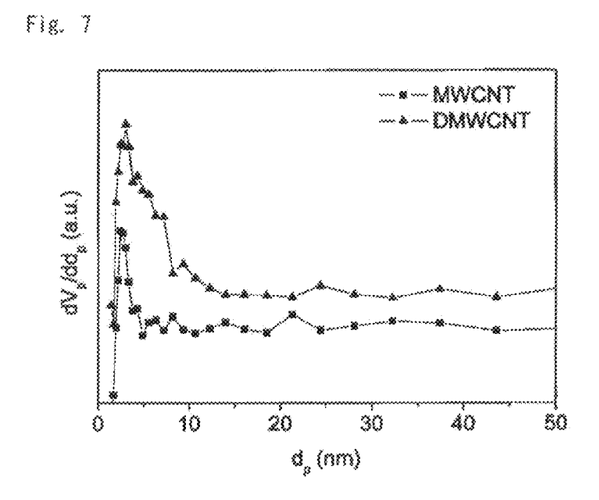
FIG. 7 is a graph showing pore size distribution profiles of MWCNT and DMWCNT produced in Example 1.
Figure 8:
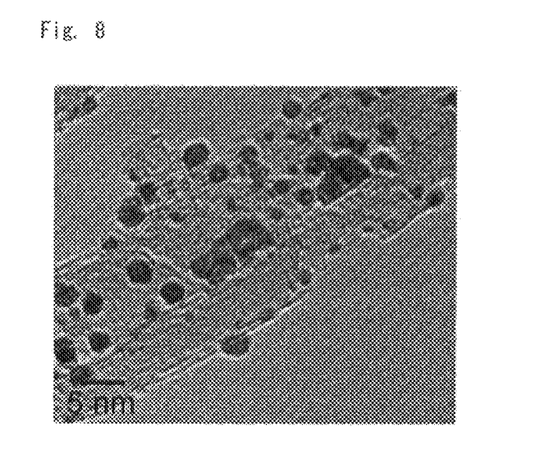
FIG. 8 is a transmission electron microscopic image of DMWCNTs on which platinum (Pt) is deposited.

The BET specific surface areas of the DMWCNTs and the MWCNTs were measured. As shown in FIG. 6, the BET specific surface area of the DMWCNTs was found to be 152 $m^2$/g, and that of the purification-pretreated MWCNTs (subjected only to the purification treatment but not to formation of pores) was found to be 106 $m^2$/g. As shown in FIG. 7, the pore distribution profile of DMWCNTs has a pore size peak at a diameter of about 5 nm, which is higher than that of the purification-pretreated MWCNTs which had not been subjected to the formation of pores.

Example 2

1) Purification of MWCNTs Through Preliminary Treatment

Multi-wall carbon nanotubes (VGCF-X, product of Showa Denko K.K.) (1 g) were purified through the same preliminary treatment as employed in Example 1.

2) Depositing Cobalt Oxide

Cobalt nitrate (II) hexahydrate, $Co(NO_3)_2 \cdot 6H_2O$, (product of Wako Pure Chemical Industries, Ltd., purity: 99.5%) (0.0551 g), ethanol (100 mL), and a stirring bar were added to a 200-mL beaker, and the mixture was stirred by means of a stirrer. The preliminarily treated purified MWCNTs (0.1 g) were added to the beaker, and the mixture was stirred by means of an ultrasonic bath for 15 minutes. The mixture was heated to 100° C. to thereby evaporate ethanol and then dried under vacuum. The dried product was ground in a mortar.

3) Provision of Pores (Defects)

Figure 9:
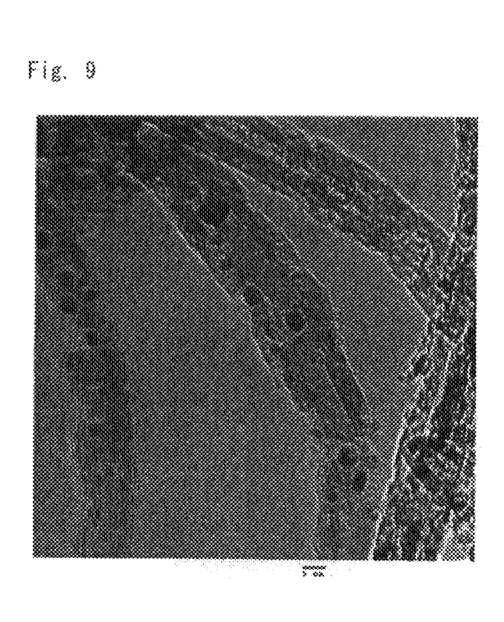
FIG. 9 is a transmission electron microscopic image of DMWCNTs produced in Example 2.

The cobalt nitrate-deposited MWCNTs were placed in a crucible, which was put into an electric furnace (KDF-75, product of DENKEN Co., Ltd.). In the electric furnace, the crucible was heated from room temperature to 250° C. over 10 minutes, maintained at 250° C. for 25 minutes, and cooled from 250° C. to room temperature over 10 minutes, thereby providing a $Co_3O_4$/MWCNT sample. FIG. 9 shows a transmission electron microscope image of the sample (pored MWCNTs; DMWCNTs). As is clear from FIG. 9, intrusion of oxide microparticles into the tubes of DMWCNTs was clearly observed. The pores were found to penetrate sidewalls of the carbon nanotubes. The pore diameter roughly corresponds to the diameter of the oxide microparticles (about 0.1 nm to about 10 nm). Some oxide microparticles were also observed to remain in sidewalls of DMWCNTs. When under other processing conditions were employed, sidewalls of DMWCNTs were thinned, i.e., the graphene layers on the sidewalls of the MWCNTs were grounded in a direction parallel to the layer direction.

To a 100-mL beaker, 2M sulfuric acid (40 mL), the $Co_3O_4$/MWCNT sample, and a stirring bar were added, and the mixture was treated for 15 minutes by means of an ultrasonic bath including a stirrer. Stirring was further performed for 4 hours. The thus-treated mixture was filtrated and washed with ultrapure water, and the procedure was repeated once. The washed product was dried overnight in a vacuum drying oven (DP33, product of Yamato Scientific Co., Ltd.) at 60° C. and 0.1 MPa. After drying, the product was ground in a mortar for 15 minutes.

Specific surface areas of the oxide-microparticle-removed DMWCNTs and the MWCNTs having no pore (defect) (i.e., only subjected to preliminary purification treatment) were measured. The specific surface area of the DMWCNTs of the invention was found to be 374 $m^2$/g, while that of the MWCNTs was found to be 264 $m^2$/g.

Example 3

In Example 3, vapor grown carbon fiber ("VGCF-X", product of Showa Denko K.K.) was used as carbon nanotubes.

Purification

Carbon nanotubes (1 g) were put into a firing furnace, and fired at about 500° C. for 1 hour in air. The fired carbon nanotubes were added to an acid mixture of concentrated nitric acid (40 mL) and 2M sulfuric acid (40 mL) and refluxed therein at 120° C. for 4 hours. Thereafter, the refluxed carbon nanotubes were stirred for 1 hour at room temperature. Then, ultrapure water was added to the stirred carbon nanotubes so that the total volume was adjusted to 400 mL, and the mixture was further stirred for 3 hours. The thus-stirred carbon nanotubes were filtrated through a PTFE membrane (pore size: 0.5 μm), washed with ultrapure water (400 mL), and dried overnight in a vacuum drying oven at 60° C. and 0.1 MPa. The dried carbon nanotubes were ground in a mortar, to thereby yield purified carbon nanotubes (through the above process, impurities such as amorphous carbon and Fe catalysts are removed, and surface functional groups are formed, to thereby enhance the hydrophilicity of the carbon nanotubes, which is advantageous for deposition of cobalt).

Deposition of Cobalt Nitrate

The thus-purified carbon nanotubes (0.1 g) and cobalt nitrate hexahydrate (0.0551 g) were dissolved in ethanol (100 mL), and the mixture was stirred by means of a stirrer at 300 rpm and at 100° C., to thereby evaporate ethanol. The obtained solid was dried overnight in a vacuum drying oven at 60° C. and 0.1 MPa. The dried solid was ground in a mortar, to thereby provide cobalt nitrate-deposited carbon nanotubes.

Formation of Cobalt Oxide

Cobalt nitrate-deposited carbon nanotubes were put into a firing furnace and fired at 300° C. for 3 hours under argon for denitration, to thereby yield cobalt oxide-deposited carbon nanotubes.

Provision of Carbon Nanotubes with Defects

Cobalt oxide-deposited carbon nanotubes were put into a firing furnace and fired at 250° C. for 1 hour in an atmosphere containing argon gas and oxygen gas at a ratio of 4:1, to thereby cause solid-phase reaction between carbon and cobalt, thereby yielding carbon nanotubes having defects.

Removal of Cobalt Oxide

The cobalt oxide-deposited carbon nanotubes having defects were added to 2M sulfuric acid (40 mL), and stirred by a stirrer for 4 hours. The thus-treated carbon nanotubes were filtrated through a PTFE membrane (pore size: 0.5 μm), washed with ultrapure water (400 mL), and dried overnight in a vacuum drying oven at 60° C. and 0.1 MPa. The dried product was ground in a mortar, to thereby yield carbon nanotubes having defects and containing no cobalt oxide.

Argon Treatment

The carbon nanotubes (DMWCNTs) were put into an electric furnace and fired at 900° C. for 1 hour under argon gas, to thereby remove surface functional groups, thereby yielding argon-treated DMWCNTs.

Production of Test Electrode

The Ar-treated carbon nanotubes having defects (2.5 mg) were put into a dispersion (0.5 mL) containing Nafion solution (product of Aldrich Co. LLC., 5 wt. %) (1 mL) and ethanol (49 mL). The dispersion mixture was stirred ultrasonically for 30 minutes to fully disperse the carbon nanotubes. On a GC (glassy carbon) electrode that had been polished in advance to have a mirror surface, a sample solution (10 μL) of the dispersion was dispensed and added dropwise to the GC electrode by means of a microsyringe. Then, ethanol was evaporated therefrom at room temperature. The dispersion was dried in a drying furnace at 60° C. for 30 minutes. In linear sweep voltammetry (LSV), 0.1M perchloric acid (150 mL) was employed as an electrolytic solution, a platinum mesh as a counter electrode, and Ag/AgCl as a reference electrode.

Cleaning of Electrode and Oxygen Reduction Current Measurement

A test cell was assembled, and gas components dissolved in a solution to be subjected to voltammetry were removed though passage of argon gas for 30 minutes. After purging with argon, the electrode was cleaned by carrying out cyclic voltammetry (CV) in a potential window of −0.3 to 0.8V and at a scan speed of 50 mV/s (20 cycles). After completion of cleaning, LSV measurement was carried out in a potential window of −0.3 to 0.8 V and at a scan speed of 5 mV/s and an electrode rotation rate of 3000 rpm. Subsequently, oxygen gas was caused to pass through the solution for 30 minutes, to thereby dissolve oxygen in the solution. After passage of oxygen gas, LSV measurement was carried out in a potential window of −0.3 to 0.8 V and at a scan speed of 5 mV/s and an electrode rotation rate of 3000 rpm.

Measurement of Background of Reduction Current

Passage of argon gas was repeated to thereby remove dissolved oxygen. After passage of argon gas, LSV measurement was carried out three times in a potential window of 0.05 to 0.8 V and at a scan speed of 5 mV/s.

Calculation of Oxygen Reduction Current

Figure 10:
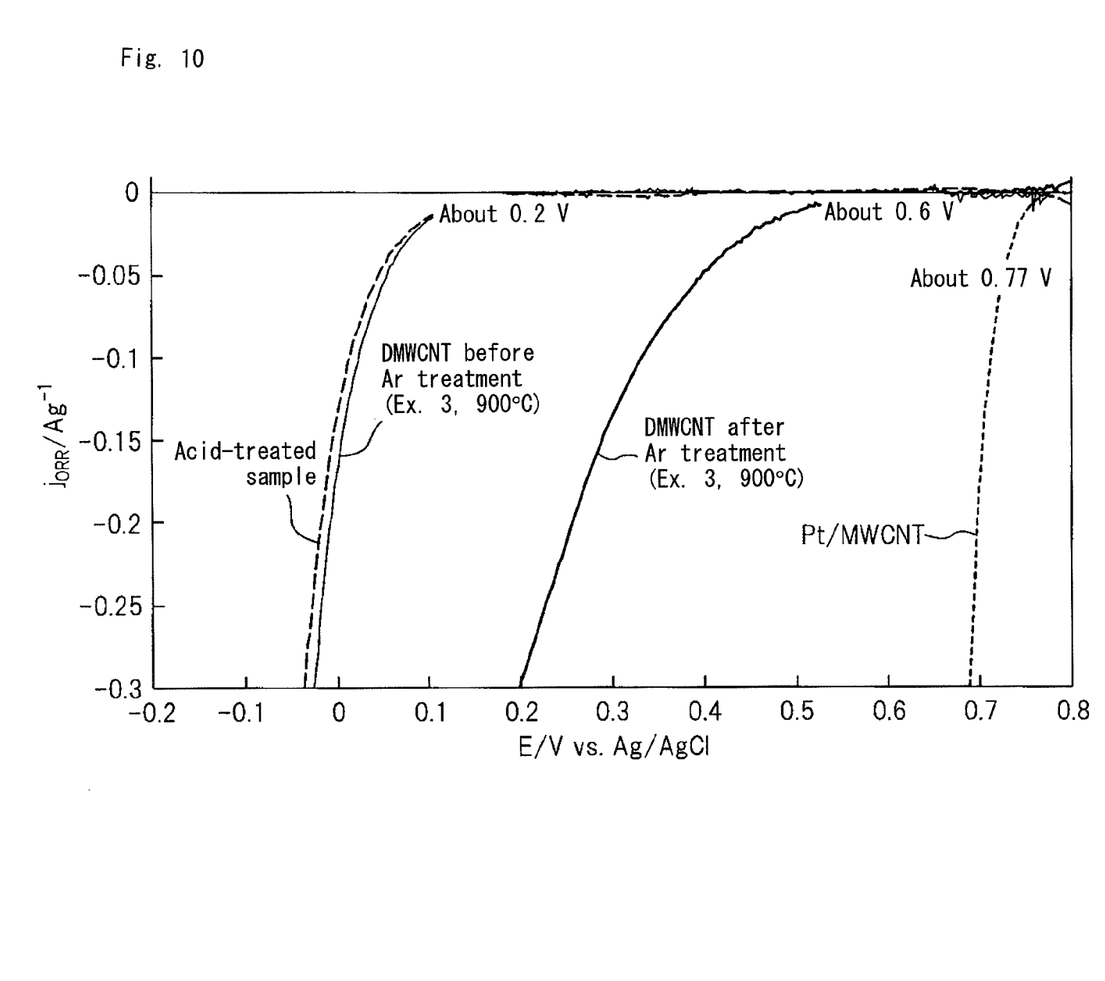
FIG. 10 is a graph showing LSV characteristics of a fuel cell air electrode catalyst produced from DMWCNTs obtained in Example 3.

The reduction current (background) measured under argon gas atmosphere was subtracted from oxygen reduction current measured in an oxygen atmosphere, to thereby obtain net current. FIG. 10 shows the obtained LSV characteristics for the argon-treated DMWCNTs. For reference, employing the same LSV measuring process, FIG. 10 also shows the LSV characteristics for the DMWCNT before argon treatment and for the acid treated MWCNT (subjected only to the acid purification but not to formation of pores), and for a conventional Pt/MWCNT catalyst in which the MWCNT has not been subjected to the formation of pores.

Example 4

Production of Anode

A Pt/C catalyst (product of Tanaka Kikinzoku Kogyo, 70 wt. %) (0.9 g), pure water (25 mL), Nafion solution (product of Aldrich Co. LLC., 5 wt. %) (5.0 g), and isopropyl alcohol (25 mL) were preliminarily mixed, and the mixture was stirred by means of a stirrer for 1 hour, to thereby prepare an anode catalyst slurry. Then, the anode catalyst slurry was uniformly sprayed to carbon paper having an area of 5 cm$^2$ (product of Toray Industries, Inc.) so that the Pt/C catalyst amount was adjusted to 1 mg/cm$^2$, and dried at 80° C. under vacuum.

Production of Cathode

The Ar-treated carbon nanotubes having defects obtained in Example 3 (0.3 g), carbon black (Vulcan XC-72, product of Vulcan) (0.075 g), pure water (870 μL), and Nafion solution (product of Aldrich, 5 wt. %) (0.226 g) were preliminarily mixed, and the mixture was kneaded by means of a kneader, to thereby provide a cathode catalyst slurry. Then, the cathode catalyst slurry was uniformly applied to carbon paper having an area of 5 cm$^2$ (product of Toray Industries, Inc.) by means of a bar coater so that the CNT catalyst amount was adjusted to 2.5 mg/cm$^2$, and dried at 80° C. under vacuum.

Production of Membrane-Electrode Assembly (MEA)

The aforementioned anode, the aforementioned cathode, and an electrolyte membrane (Nafion 212 (Registered trademark), product of DuPont) were stacked to form an anode/electrolyte membrane/cathode structure. A pressure (0.1 MPa) was applied to the stacked structure at 140° C. for 360 seconds by means of a press machine, to thereby produce an electrode-membrane assembly.

Fuel Cell Performance Evaluation

Figure 11:
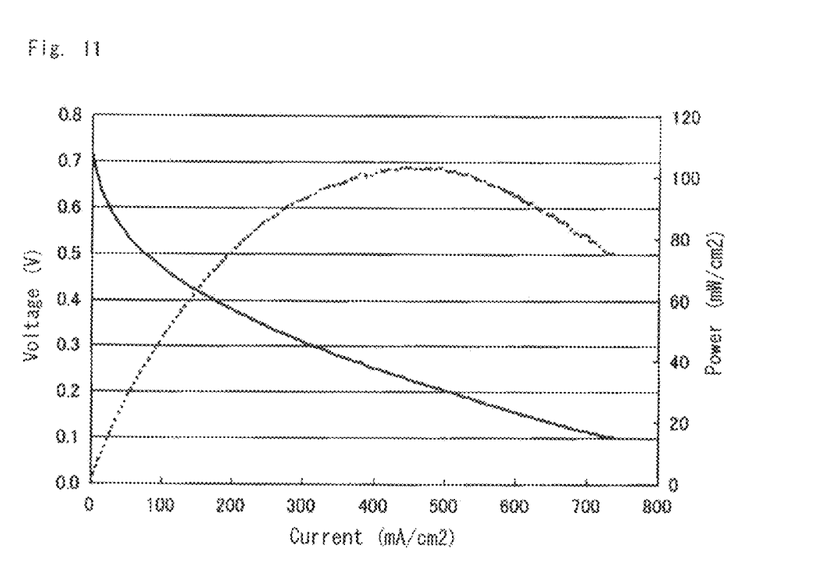
FIG. 11 is a graph showing fuel cell characteristics measured in Example 4.

The thus-produced MEA was sandwiched by grooved separators, to thereby produce a unit cell for performance evaluation. The unit cell was incorporated into a fuel cell for property evaluation. Pure hydrogen gas was fed to the anode at a back pressure of 300 kPa and a flow rate of 200 mL/min. Pure oxygen gas was fed to the cathode at a back pressure of 300 kPa and a flow rate of 400 mL/min. The fuel cell was operated at an operating temperature of 90° C. and a relative humidity of 100%, and cell performance was evaluated. FIG. 11 shows the results. In FIG. 11, a solid line represents voltage (V), and a dashed line represents power (mW/cm$^2$). As is clear from FIG. 11, the fuel cell including the cathode formed of the carbon nanotubes having defects according to the present invention was found to have excellent power generation performance.

INDUSTRIAL APPLICABILITY

The present invention enables provision, without intentional addition of metal or nitrogen, of a fuel cell air electrode catalyst employing modified CNTs having the same redox activity as that of a conventional "carbon alloy catalyst."

What is claimed is:

1. A process for producing a fuel cell electrode comprising depositing a metal oxide or a metal nitrate in the form of microparticles on the surfaces of carbon nanotubes, and heating the carbon nanotubes at 100 to 1,000° C. in an oxygen-containing atmosphere to foam a catalyst, and applying the catalyst to a support layer.

2. The process for producing a fuel cell electrode according to claim 1, wherein the metal oxide is cobalt oxide, iron oxide, vanadium oxide, tin oxide, or nickel oxide, and the metal nitrate is cobalt nitrate, iron nitrate, vanadium nitrate, tin nitrate, or nickel nitrate.

3. A process for producing a fuel cell electrode according to claim 2, wherein the catalyst is formed by the sequential steps of depositing a metal oxide or a metal nitrate in the form of microparticles on the surfaces of carbon nanotubes, heating the carbon nanotubes at 100 to 1,000° C. in an oxygen-containing atmosphere, removing the metal oxide microparticles with acid, and heating the treated carbon nanotubes at 500 to 3,000° C. in inert gas or vacuum.

4. A process for producing a fuel cell electrode according to claim 2, wherein the catalyst is formed by the sequential steps of depositing a metal oxide or a metal nitrate in the form of microparticles on the surfaces of carbon nanotubes, heating the carbon nanotubes at 100 to 1,000° C. in an oxygen-containing atmosphere, and removing the metal oxide microparticles with acid.

5. A process for producing a fuel cell electrode according to claim 4, wherein the catalyst is formed by the sequential steps of depositing a metal oxide or a metal nitrate in the form of microparticles on the surfaces of carbon nanotubes, heating the carbon nanotubes at 100 to 1,000° C. in an oxygen-containing atmosphere, removing the metal oxide microparticles with acid, and heating the treated carbon nanotubes at 500 to 3,000° C. in inert gas or vacuum.

6. A process for producing a fuel cell electrode as recited in claim 2, wherein the carbon nanotubes have a multi-wall structure.

7. A process for producing a fuel cell electrode according to claim 1, wherein the catalyst is formed by the sequential steps of depositing a metal oxide or a metal nitrate in the form of microparticles on the surfaces of carbon nanotubes, heating the carbon nanotubes at 100 to 1,000° C. in an oxygen-containing atmosphere, and removing the metal oxide microparticles with acid.

8. A process for producing a fuel cell electrode according to claim 1, wherein the carbon nanotubes have a multi-wall structure.

9. A fuel cell employing a fuel cell electrode produced through a process for producing a fuel cell electrode according to claim 8.

* * * * *